(12) United States Patent
Isono (10) Patent No.: US 11,047,442 B2
(45) Date of Patent: Jun. 29, 2021

(54) BRAKE UNIT

(71) Applicant: TOYOTA JIDOSHA KABUSHIKI KAISHA, Toyota (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 462 days.

(21) Appl. No.: 15/880,982

(22) Filed: Jan. 26, 2018

(65) Prior Publication Data

US 2018/0209500 A1    Jul. 26, 2018

(30) Foreign Application Priority Data

Jan. 26, 2017  (JP) .............................. JP2017-012291

(51) Int. Cl.
| | |
|---|---|
| *F16D 67/06* | (2006.01) |
| *F16D 65/18* | (2006.01) |
| *F16H 37/06* | (2006.01) |
| *F16D 121/20* | (2012.01) |
| *F16H 48/19* | (2012.01) |

(52) U.S. Cl.
CPC ........... *F16D 67/06* (2013.01); *F16D 65/186* (2013.01); *F16H 37/065* (2013.01); *F16D 2121/20* (2013.01); *F16H 48/19* (2013.01)

(58) Field of Classification Search
CPC ......... F16H 2048/366; F16H 2048/368; F16H 48/22; F16H 48/24; F16H 37/065; F16H 48/19; F16D 13/22; F16D 2027/00; F16D 2027/14; F16D 2027/007; F16D 27/00; F16D 27/14; F16D 2121/18; F16D 2121/20; F16D 2121/22; F16D 2121/24; F16D 2121/26; F16D 2125/26; F16D 2125/18; F16D 67/06; F16D 65/186; B60K 17/16; B60T 1/062
See application file for complete search history.

(56) References Cited

U.S. PATENT DOCUMENTS

| | | | | |
|---|---|---|---|---|
| 4,843,910 | A * | 7/1989 | Loeber | B60K 17/046 |
| | | | | 475/343 |
| 10,442,291 | B2 * | 10/2019 | Isono | F16D 55/2262 |
| 10,654,483 | B2 * | 5/2020 | Nasu | B60K 7/0007 |

(Continued)

FOREIGN PATENT DOCUMENTS

| | | |
|---|---|---|
| JP | S59-160624 A | 9/1984 |
| JP | S60-149537 U | 10/1985 |

(Continued)

*Primary Examiner* — Jeffrey A Shapiro
(74) *Attorney, Agent, or Firm* — Oliff PLC (57) ABSTRACT

A brake unit that is downsized without reducing brake torque applied to wheels. The brake unit comprises: a first brake device that applies brake torque to a first rotary shaft; a first speed reducing device that transmits the brake torque to a first drive shaft connected the right wheel; a second brake device that applies brake torque to the second rotary shaft; and a second speed reducing device that transmits the brake torque to the second drive shaft connected to the right wheel. A rotational center axis of the first rotary shaft extends parallel to that of the first driveshaft, and a rotational center axis of the second rotary shaft extends parallel to that of a second driveshaft.

8 Claims, 5 Drawing Sheets

(56) References Cited

U.S. PATENT DOCUMENTS

| | | | | |
|---|---|---|---|---|
| 2001/0027905 A1* | 10/2001 | Taureg | ............... | F16D 25/0638 |
| | | | | 192/35 |
| 2005/0209761 A1* | 9/2005 | Elie | ......................... | F16H 48/30 |
| | | | | 701/67 |
| 2008/0015764 A1* | 1/2008 | Watanabe | ........... | B60W 40/109 |
| | | | | 701/72 |
| 2014/0371016 A1* | 12/2014 | Knoblauch | ......... | B60L 15/2036 |
| | | | | 475/5 |
| 2016/0039405 A1* | 2/2016 | Terayama | ............ | B60K 7/0007 |
| | | | | 701/22 |
| 2017/0008422 A1* | 1/2017 | Honda | ................. | B60K 17/348 |
| 2017/0166061 A1* | 6/2017 | Isono | ..................... | F16D 65/18 |
| 2017/0313181 A1 | 11/2017 | Isono et al. | | |
| 2018/0023641 A1* | 1/2018 | Cole, Jr. | .................. | B66D 5/14 |
| | | | | 188/71.5 |

FOREIGN PATENT DOCUMENTS

| | | | |
|---|---|---|---|
| JP | 2003-247572 A | 9/2003 |
| JP | 2004-032840 A | 1/2004 |
| JP | 2007-198558 A | 8/2007 |
| JP | 2012-076506 A | 4/2012 |
| JP | 2017-129181 A | 7/2017 |
| JP | 2017198322 A | 11/2017 |

\* cited by examiner

BRAKE UNIT

CROSS REFERENCE TO RELATED APPLICATION

The present invention claims the benefit of Japanese Patent Application No. 2017-012291 filed on Jan. 26, 2017 with the Japanese Patent Office, the disclosures of which are incorporated herein by reference in its entirety.

BACKGROUND

Field of the Invention

Embodiments of the present application relate to the art of a brake unit for applying brake torque to right and left drive wheels.

Discussion of the Related Art

JP-A-2012-076506 describes one example of a drive unit comprising two motors serves as prime movers. In the drive unit taught by JP-A-2012-076506, a first shaft extending widthwise and a second shaft extending widthwise are connected to each other. Drive wheels are connected to each of the shafts while being allowed to reciprocate vertically, and brake devices are arranged to apply a brake torque to each of the shafts. According to the teachings of JP-A-2012-076506, the brake device comprises: a first brake disc integrated with a protrusion of the first shaft; a second brake disc integrated with a protrusion of the second shaft; and a brake caliper for applying a frictional force to the brake discs.

In the drive unit taught by JP-A-2012-076506, the brake device is not allowed to reciprocate vertically together with the drive wheel, and hence an unsprung load of the vehicle may be reduced. However, larger actuator for establishing the friction force and a larger rotary member to which the friction force is applied are required to achieve a larger brake torque, therefore, it is required downsize the conventional brake devices.

SUMMARY

Aspects of embodiments of the present disclosure have been conceived noting the foregoing technical problems, and it is therefore an object of embodiments of the present application is to provide a brake unit that is downsized without reducing a brake torque applied to the wheel.

The present disclosure relates to a brake unit, comprising: a first driveshaft that is connected to one of right and left wheels; and a second drive shaft that is connected to the other one of the right and left wheels while being allowed to rotate relatively to the first driveshaft. In the brake unit, brake torques are applied to the first drive shaft and the second drive shaft separately. According to one aspect of the present disclosure, the brake unit comprises: a first rotary member; a first brake device that applies a brake torque to the first rotary member; a first speed reducing device that is connected to the first rotary member and the first driveshaft to transmit the brake torque applied to the first rotary member from the first brake device to the first drive shaft while amplifying; a second rotary member; a second brake device that applies a brake torque to the second rotary member; and a second speed reducing device that is connected to the second rotary member and the second driveshaft to transmit the brake torque applied to the second rotary member from the second brake device to the second drive shaft while amplifying. In the brake unit, a rotational center axis of a first input member to which the brake torque is delivered from the first rotary member of the first speed reducing device extends in parallel with a rotational center axis of a first output member that transmits the brake torque to the first driveshaft of the first speed reducing device. In addition, a rotational center axis of a second input member to which the brake torque is delivered from the second rotary member of the second speed reducing device extends in parallel with a rotational center axis of a second output member that transmits the brake torque to the second driveshaft of the second speed reducing device.

In a non-limiting embodiment, the brake unit may further comprise a clutch that connects a rotary member in a first torque transmitting route of the first speed reducing device including the first rotary member, with a rotary member in a second torque transmitting route of the second speed reducing device including the second rotary member.

In a non-limiting embodiment, the clutch may comprise: a connection plate that is connected to an end portion of the first rotary member or the second rotary member; a pushing plate made of magnetic material; a coil spring that pushes the pushing plate toward the connection plate; and an electromagnetic coil that is energized to apply an electromagnetic force to the pushing plate against an elastic force of the coil spring.

In a non-limiting embodiment, the brake unit may further comprise a brake torque maintaining device that maintains a brake torque established by any one of the first brake device and the second brake device.

In a non-limiting embodiment, the brake torque maintaining device may include an electromagnetic actuator that is unenergized to maintain the brake torque established by any one of the first brake device and the second brake device.

In a non-limiting embodiment, any one of the first brake device and the second brake device may include a brake rotor and a stopper member, any one of the first brake device and the second brake device may be adapted to apply a brake torque to the brake rotor by bringing the stopper member into frictional contact to the brake rotor, and the brake torque maintaining device may be adapted to maintain a frictional force acting between the stopper member and the brake rotor.

In a non-limiting embodiment, the first rotary member may be rotated integrally with a first brake rotor, the first brake device may be adapted to apply a brake torque to the first brake rotor by bringing a first stopper member into frictional contact to the first brake rotor, the second rotary member may be rotated integrally with a second brake rotor, the second brake device may be adapted to apply a brake torque to the second brake rotor by bringing a second stopper member into frictional contact to the second brake rotor, and the electromagnetic actuator may include a brake motor that is rotated in one direction to bring any one of the first stopper member and the first brake rotor into contact to the other one of the first stopper member and the first brake rotor, and to bring any one of the second stopper member and the second brake rotor into contact to the other one of the second stopper member and the second brake rotor.

As described, the present disclosure relates to a brake unit, comprising: a first driveshaft that is connected to one of right and left wheels; and a second drive shaft that is connected to the other one of the right and left wheels while being allowed to rotate relatively to the first driveshaft. In the brake unit, brake torques are applied to the first drive shaft and the second drive shaft separately. As also described, the brake unit comprises: a first rotary member; a first brake device that applies a brake torque to the first rotary member; a first speed reducing device that is connected to the first rotary member and the first driveshaft to transmit the brake torque applied to the first rotary member from the first brake device to the first drive shaft while amplifying; a second rotary member; a second brake device that applies a brake torque to the second rotary member; and a second speed reducing device that is connected to the second rotary member and the second driveshaft to transmit the brake torque applied to the second rotary member from the second brake device to the second drive shaft while amplifying. According to another aspect of the present disclosure, the first speed reducing device includes a first planetary gear unit comprising a first input element that is connected to the first brake device, a first output element that is connected to the first driveshaft, and a first reaction element that establishes a reaction to output an input torque to the first input element from the first output element, and the second speed reducing device includes a second planetary gear unit comprising a second input element that is connected to the second brake device, a second output element that is connected to the second driveshaft, and a second reaction element that establishes a reaction to output an input torque to the second input element from the second output element. In the brake unit according to another aspect of the present disclosure, a rotational center axis of a first input member to which the brake torque is delivered from the first rotary member of the first speed reducing device also extends in parallel with a rotational center axis of a first output member that transmits the brake torque to the first driveshaft of the first speed reducing device, and a rotational center axis of a second input member to which the brake torque is delivered from the second rotary member of the second speed reducing device also extends in parallel with a rotational center axis of a second output member that transmits the brake torque to the second driveshaft of the second speed reducing device. According to another aspect of the present disclosure, the brake unit further comprises a clutch that equalizes rotational speeds of the first driveshaft and the second driveshaft, by connecting a rotary member in a first torque transmitting route of the first speed reducing device including the first rotary member, with a rotary member in a second torque transmitting route of the second speed reducing device including the second rotary member.

In a non-limiting embodiment, the first brake device may include a first actuator that establishes an electromagnetic force to control a brake torque when energized, and the second brake device may include a second actuator that establishes an electromagnetic force to control a brake torque when energized.

Thus, according to the embodiment of the present disclosure, the brake torques generated by the brake devices are delivered to the driveshafts through the speed reducing devices while being amplified. According to the embodiment, therefore, the maximum the brake torque required for the brake device may be reduced, and hence the brake device may be downsized. In addition, since the brake device is situated in an input side of the driveshaft, number of parts attached to the wheel may be reduced. According to the embodiment, therefore, an unsprung load of the vehicle may be reduced to improve running stability of the vehicle.

In addition, the brake torques may be applied separately to the right wheel and the left wheel from each of the brake devices. According to the embodiment, therefore, the vehicle is allowed to turn easily.

As described, the brake unit is provided with the clutch to connect the rotary member in the first torque transmitting route with the rotary member in the second torque transmitting route thereby rotating those rotary members integrally. According to the embodiment, therefore, when the vehicle is travelling in a straight line or making a slight turn, the rotary members in the first torque transmitting route and the second torque transmitting route are rotated integrally even if the brake torques applied to those members are different. For this reason, a relative rotation between the right wheel and the left wheel can be prevented during propulsion in a straight line or making a slight turn to improve running stability of the vehicle without requiring accurate control.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
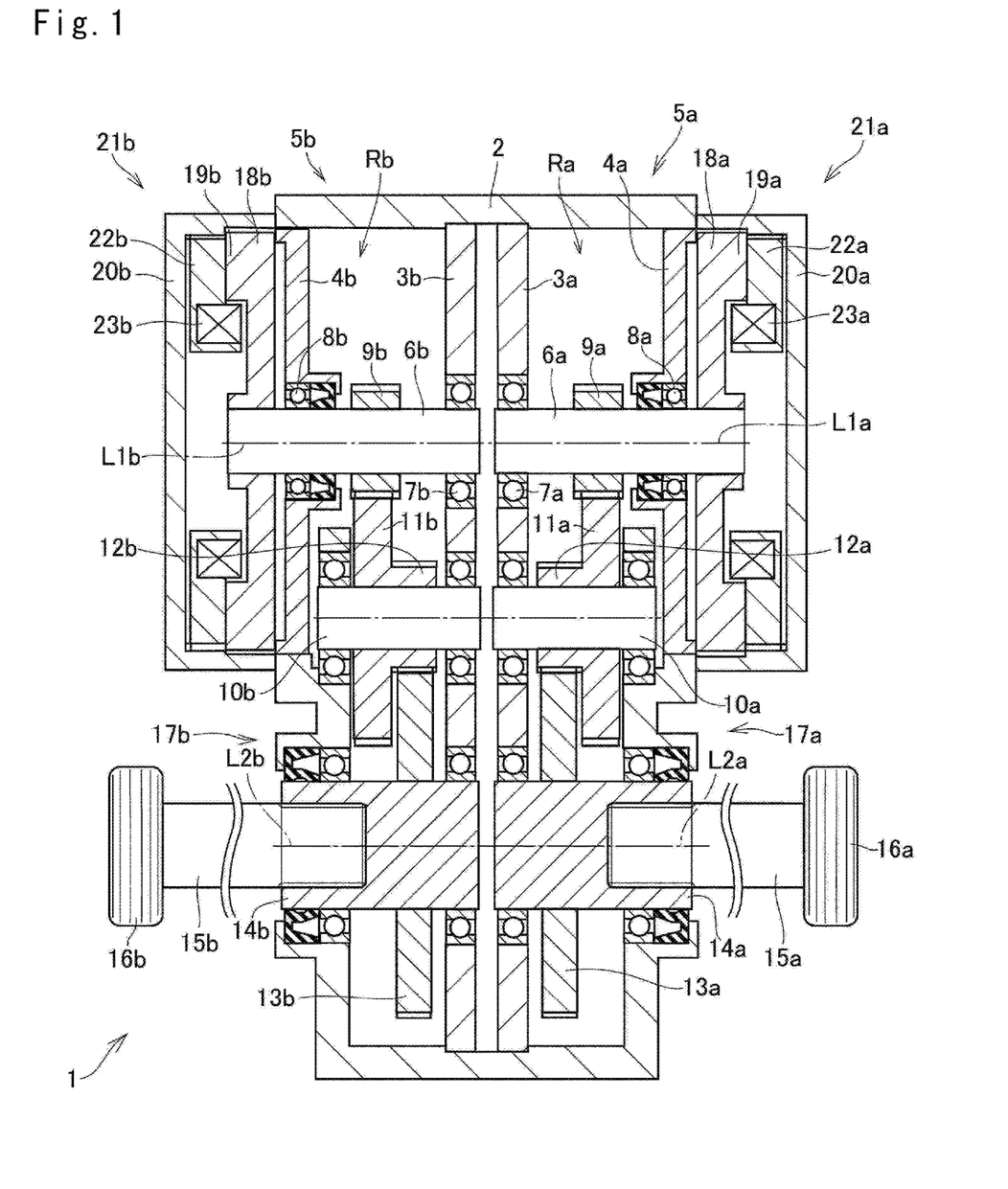
FIG. 1 is a cross-sectional view showing a structure of the brake unit according to a first embodiment of the present disclosure.

The embodiments of the present application will now be explained with reference to the accompanying drawings. Turning now to FIG. 1, there is shown the first embodiment of a brake unit according to the present disclosure. As can be seen from FIG. 1, a structure of the brake unit 1 is substantially symmetrical across a width center of the vehicle. In the following explanation, accordingly, the reference letter "a" designates members arranged in the right half of the brake unit 1, and the reference letters "b" designates members arranged in the left half of the brake unit 1. In addition, the members in the right half of the brake unit 1 will be called the "first member" of the brake unit 1, and the members in the left half of the brake unit 1 will be called the "second member" of the brake unit as necessary.

The brake unit 1 shown in FIG. 1 is adapted to perform a differential action. To this end, the brake unit 1 is provided with a brake device that applies a brake torque to one of the pair of wheels, and a brake device that applies a brake torque to the other one of the pair of wheels. According to the embodiments, therefore, the brake torques may be applied separately to a right wheel and a left wheel as an anti-lock system.

The brake unit 1 is held in a casing 5 including a center housing 2, bulkheads 3a and 3b dividing an internal space of the center housing 2 at a width center, and a side walls 4a and 4b. Rotary shaft 6a and 6b extend in a width direction in the casing 5 while penetrating through the bulkhead 3 and the side wall 4. The rotary shaft 6a is rotatably supported by a bearing 7a fitted with the bulkhead 3a and a bearing 8a fitted with the side wall 4a. On the other hand, the rotary shaft 6b is rotatably supported by a bearing 7b fitted with the bulkhead 3b and a bearing 8b fitted with the side wall 4b.

An output gear 9 is fitted onto a width center portion of the rotary shaft 6, and a countershaft 10 extends parallel to the rotary shaft 6. A counter driven gear 11 that is diametrically larger than the output gear 9 is fitted onto a laterally outer portion of the countershaft 10 while being meshed with the output gear 9, and a pinion gear 12 that is diametrically smaller than the counter driven gear 11 is also fitted onto a laterally inner portion of the countershaft 10 to be meshed with a final reduction gear 13 that is diametrically larger than the pinion gear 12.

A cylindrical shaft 14 is inserted into the final reduction gear 13 in such a manner as to protrude laterally outwardly while opening to laterally outside. Specifically, the cylindrical shaft 14 extends in such a manner that a rotational center axis L2 thereof extends in parallel with the rotational center axis L1 of the rotary shaft 6. A laterally inner end of a driveshaft 15 is splined into the opening of the cylindrical shaft 14, and a wheel 16 is attached to a laterally outer end of the driveshaft 15. As the conventional driveshaft, the driveshaft 15 is provided with a connecting device (not shown) such as a constant-velocity joint for adjusting a level of the rotational center.

Accordingly, torque of the output gear 9 is delivered to the driveshaft 15 while being multiplied in accordance with a gear ratio between the output gear 9 and the counter driven gear 11, and a gear ratio between the pinion gear 12 and the final reduction gear 13. That is, the output gear 9, the counter driven gear 11, the pinion gear 12 and the final reduction gear 13 serve as a speed reducing device 17. In addition, the rotary shaft 6, the output gear 9, the counter driven gear 11, the pinion gear 12, and the final reduction gear 13 form a torque transmitting route R.

The output gear 9, the counter driven gear 11, the pinion gear 12, the final reduction gear 13, the countershaft 10 and the cylindrical shaft 14 are held in the center housing 2. A right end of the center housing 2 is joined to the side wall 4a, and a left end of the center housing 2 is joined to the side wall 4b. That is, the countershaft 10 and the cylindrical shaft 14 are supported by the center housing 2 in a rotatable manner.

Specifically, in the center housing 2, the rotary shaft 6a and the rotary shaft 6b are held in such a manner that the rotational center axis L1a of the rotary shaft 6a and the rotational center axis L1b of the rotary shaft 6b are aligned coaxially with each other. Likewise, the rotational center axis L2a of the cylindrical shaft 14a and the rotational center axis L2b of the cylindrical shaft 14b are aligned coaxially with each other.

A disc-shaped brake rotor 18 made of magnetic material is fitted onto a laterally outer end of the rotary shaft 6. An outer diameter of the brake rotor 18 is slightly smaller than an inner diameter of the side wall 4, and an annular protrusion 19 is formed to protrude laterally outwardly.

A cylindrically-bottomed cover member 20 having an inner diameter larger than the outer diameter of the brake rotor 18 is joined to a laterally outer end of the side wall 4. A brake device 21 is held in a space enclosed by the side wall 4 and the cover member 20 to stop a rotation of the rotary shaft 6.

The brake device 21 comprises the brake rotor 18, and an annular pushing member 22 opposed to the annular protrusion 19 of the brake rotor 18. An outer circumferential face of the pushing member 22 is splined to an inner circumferential face of the cover member 20 so that the pushing member 22 is allowed to reciprocate in an axial direction of the cover member 20 but is not allowed to rotate. An inner circumferential portion of the pushing member 22 is situated in an inner circumferential side of the annular protrusion 19 while being protruded toward the brake rotor 18, and an electromagnetic coil (to be simply caller the "coil" hereinafter) 23 is wound around the protrusion of the pushing member 22. Accordingly, the pushing member 22a serves as a first stopper member of the brake unit, and the pushing member 22b serves as a second stopper member of the brake unit.

When the coil 23 is energized, the coil 23 generates an electromagnetic force so that the pushing member 22 is brought into contact to the brake rotor 18 by the electromagnetic force. In this situation, since the pushing member 22 is not allowed to rotate, a frictional brake torque is applied to the brake rotor 18 according to a contact pressure between the pushing member 22 and the brake rotor 18. Consequently, the brake torque is applied to the rotary shaft 6. The frictional force acting between the brake rotor 18 and the pushing member 22 is changed depending on a current value applied to the coil 23, that is, the brake torque applied to the brake rotor 18 can be controlled by controlling the current value applied to the coil 23. Accordingly, in the brake unit 1, the rotary shaft 6a serves as a first rotary member, the rotary shaft 6b serves as a second rotary member, the output gear 9a serves as a first input member, the output gear 9b serves as a second input member, the cylindrical shaft 14a serves as a first output member, the cylindrical shaft 14b serves as a second output member, the coil 23a serves as a first actuator, and the coil 23b serves as a second actuator.

Specifically, the driving forces of the wheel 16a and the wheel 16b may be equalized by controlling current values applied to the coils 23a and 23b in such a manner as to equalize the brake torques applied the wheels 16a and 16b. By contrast, the driving forces of the wheel 16a and the wheel 16b may also be differentiated to stabilize vehicle behavior during turning by differentiating the brake torques of the brake devices 21a and 21b in such a manner as to differentiate the torques of the driveshafts 15a and 15b. Thus, the brake unit 1 is adapted to perform a differential action.

The brake torques generated by the brake devices 21a and 21b are delivered to the wheels 16a and 16b through the speed reducing devices 17a and 17b while being amplified. For this reason, the maximum brake torque required for the brake device 21 may be reduced, and hence the brake device 21 may be downsized.

In addition, since the brake device 21 is situated in an input side of the driveshaft 15, number of parts attached to the wheel 16 may be reduced. In the brake unit 1, therefore, an unsprung load of the vehicle may be reduced to improve running stability of the vehicle.

Further, as described, the rotary shaft 6 and the driveshaft 15 are arranged in such a manner that the rotational center axis L1 of the rotary shaft 6 and the rotational center axis L2 of the cylindrical shaft 14 are aligned parallel to each other. In the brake unit 1, therefore, the final reduction gear 13a and the final reduction gear 13b may be arranged close to each other, and the cylindrical shaft 14a and the cylindrical shaft 14b may be arranged close to each other. For this reason, each of the driveshaft 15 may be elongated so that an oscillation angle of the connecting device (not shown) of the driveshaft 15 may be reduced to reduce a power loss.

Figure 2:
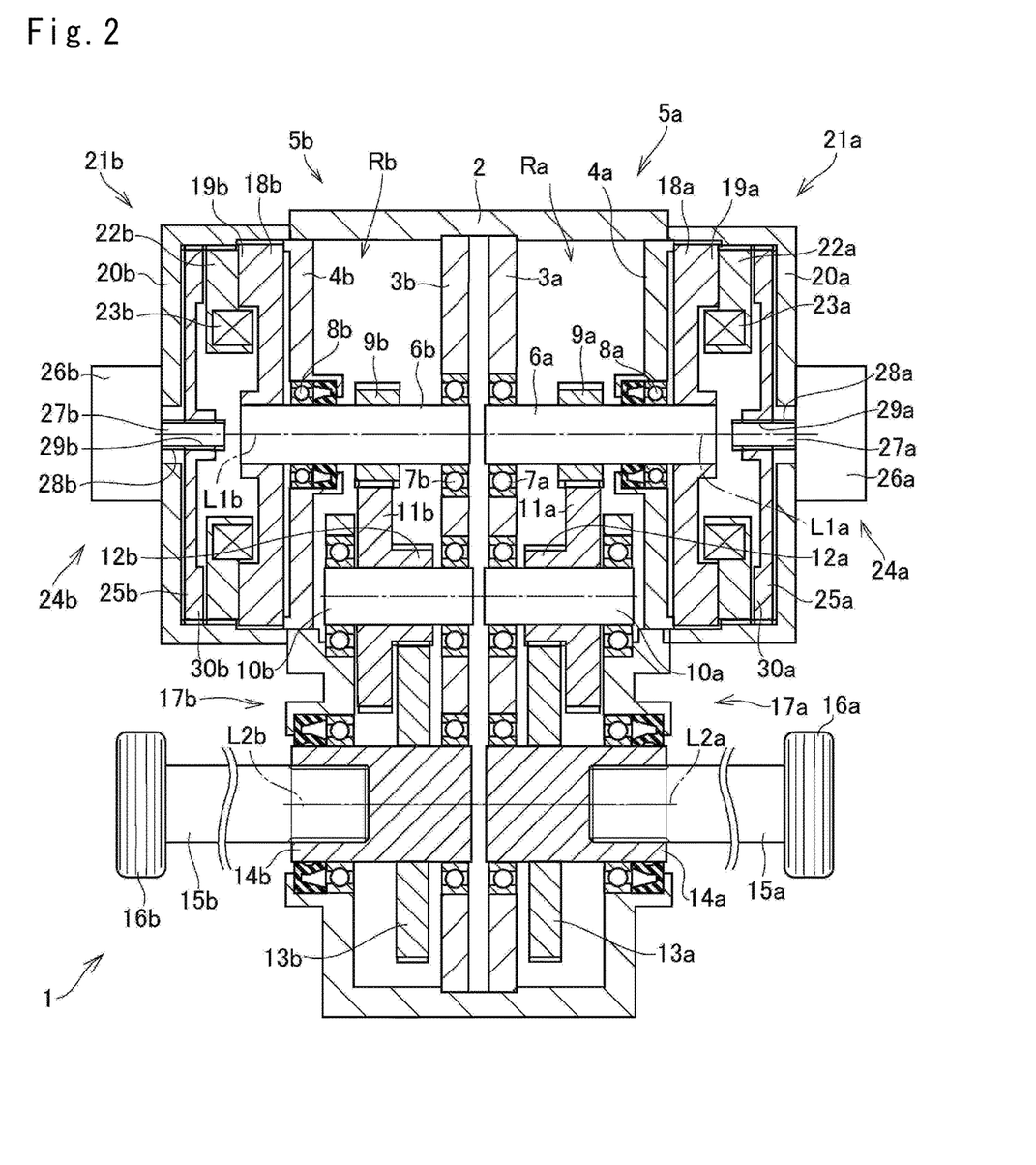
FIG. 2 is a cross-sectional view showing a structure of the brake unit according to a second embodiment of the present disclosure.

The brake torque applied to the rotary shaft 6 may not be maintained when the power is off to park the vehicle. In order to maintain a frictional contact between the brake rotor 18 and the pushing member 22 during parking, the brake unit 1 shown in FIG. 2 is provided with a parking lock device 24 as a brake torque maintaining device. Specifically, the parking lock device 24 comprises an annular plate member 25 opposed to the brake rotor 18 across the pushing member 22, and a parking motor 26 that reciprocates the plate member 25 in the axial direction. Accordingly, the parking motor 26 serves as an electromagnetic actuator and a brake motor of the brake unit 1.

The parking motor 26 is attached to an outer face a sidewall of the cover member 20, and a rotary shaft 27 of the parking motor 26 penetrates through the sidewall of the cover member 20 and the plate member 25. A male thread 28 is formed on an outer circumferential face of the rotary shaft 27 of the parking motor 26, and a female thread 29 is formed on an inner circumferential face of the plate member 25 to be mated with the male thread 28. An outer circumferential edge of the plate member 25 is also splined to the inner circumferential face of the cover member 20 so that the plate member 25 is allowed to reciprocate on the rotary shaft 27 by actuating the parking motor 26. Thus, the rotary shaft 27 and the plate member 25 serve as a feed screw mechanism. In addition, an annular protrusion 30 protruding toward the pushing member 22 is formed on an outer circumferential portion of the plate member 25 to be contacted to the pushing member 22.

In order to maintain the brake torque when the vehicle is powered off or when a shift lever is shifted to the parking position, the plate member 25 is brought into contact to the pushing member 22 to clamp the pushing member 22 between the plate member 25 and the brake rotor 18 by activating the parking motor 26, and then the current supply to the parking motor 26 is stopped. Consequently, the brake torque is maintained by the brake device 21.

Figure 3:
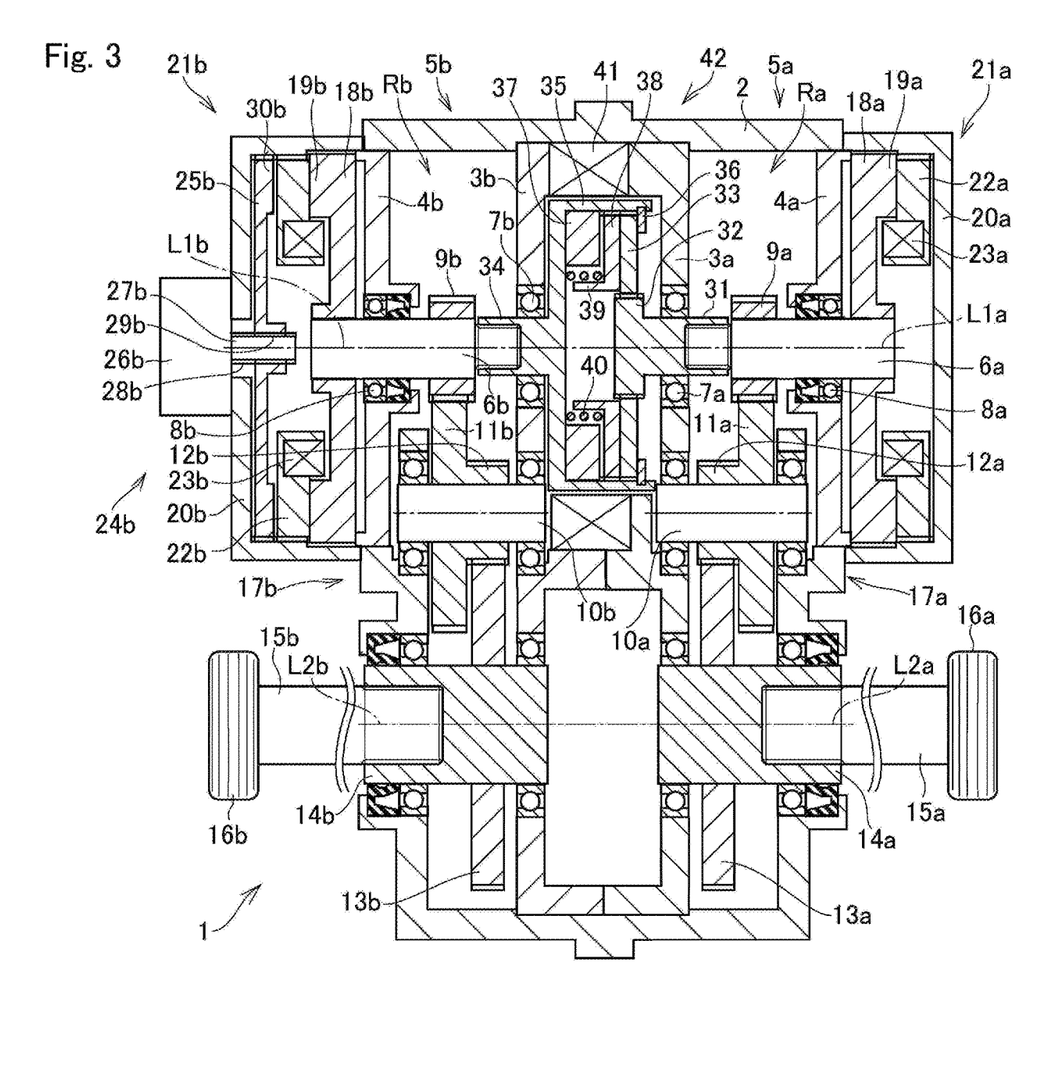
FIG. 3 is a cross-sectional view showing a structure of the brake unit according to a third embodiment of the present disclosure.

When the vehicle is travelling in a straight line or making a slight turn, it is preferable to equalize rotational speeds of the wheel 16a and the wheel 16b by equalizing the torques applied thereto. To this end, in the brake units 1 shown in FIGS. 1 and 2, the output torques of the brake devices 21a and 21b have to be synchronized accurately. Turning to FIG. 3, there is shown an embodiment of the brake unit 1 in which the rotary shaft 6a and the rotary shaft 6b are rotated integrally. In the following explanation, common reference numerals are allotted to the elements in common with those in the foregoing embodiments, and detailed explanation for those common elements will be omitted.

According to the embodiment shown in FIG. 3, a leading end of the rotary shaft 6a protrudes from the output gear 9a toward the width center of the brake unit 1 to be connected to a connection shaft 31. Specifically, a hollow portion to which the leading end of the rotary shaft 6a is inserted is formed on a leading end of the connection shaft 31, and a flange 32 is formed on a base end of the connection shaft 31. A spline is formed on an outer circumferential face of the flange 32 so that an annular connection plate 33 is splined onto the flange 32.

A leading end of the rotary shaft 6b also protrudes from the output gear 9b toward the width center of the brake unit 1 to be connected to an extension shaft 34. Specifically, a hollow portion is formed on a leading end of the extension shaft 34, and the leading end of the rotary shaft 6b is inserted into the hollow portion. On the other hand, a bottomed-cylindrical holder portion 35 is formed on a base end of the extension shaft 34, and the connection plate 33 is held in the holder portion 35 while being allowed to rotate relatively thereto. In order to prevent detachment of the connection plate 33 from the holder portion 35, a snap ring 36 is attached to an opening end of the holder portion 35.

In the holder portion 35, an annular positioning plate 37 is disposed adjacent to a bottom wall, and an annular pushing plate 38 is interposed between the positioning plate 37 and the connection plate 33. The pushing plate 38 is splined to the holder portion 35 so that the pushing plate 38 is allowed to rotate integrally with the holder portion 35 and to reciprocate in the axial direction within the holder portion 35. The pushing plate 38 is made of magnetic material, and a cylindrical portion 39 protrudes from an inner circumferential end of the pushing plate 38 toward the bottom wall of the holder portion 35. A coil spring 40 is fitted onto the cylindrical portion 39 while being compressed by the pushing plate 38 and the bottom wall of the holder portion 35. A coil 41 is wound around the holder portion 35.

When the coil 41 is energized, an electromagnetic force is applied to the pushing plate 38 to push the pushing plate 38 toward the bottom wall of the holder portion 35 against the elastic force of the coil spring 40. By contrast, when a current supply to the coil 41 is stopped, the pushing plate 38 is pushed by the coil spring 40 to be brought into frictional contact to the connection plate 33. The friction force to be established between the pushing plate 38 and the connection plate 33 is adjusted in such a manner that a relative rotation between the pushing plate 38 and the connection plate 33 will not be caused by a speed difference or a torque difference between the rotary shaft 6a and the rotary shaft 6b during propulsion in a straight line or making a slight turn. Specifically, a torque transmitting capacity between the pushing plate 38 and the connection plate 33 is governed by a current value applied to the coil 41, and a torque transmission between the pushing plate 38 and the connection plate 33 is interrupted by stopping a current supply to the coil 41. That is, the pushing plate 38 and the connection plate 33 serve as a friction clutch 42 using the coil 41 as an electromagnetic actuator.

Specifically, when the vehicle is travelling in a straight line or making a slight turn, the current supply to the coil 41 is stopped to bring the pushing plate 38 into frictional contact to the connection plate 33. Consequently, the rotary shaft 6a and the rotary shaft 6b are rotated integrally even if the brake torques of the brake devices 21a and 21b are different. For this reason, a relative rotation between the wheel 16a and the wheel 16b can be prevented during propulsion in a straight line or making a slight turn to improve running stability of the vehicle without requiring accurate control.

Figure 4:
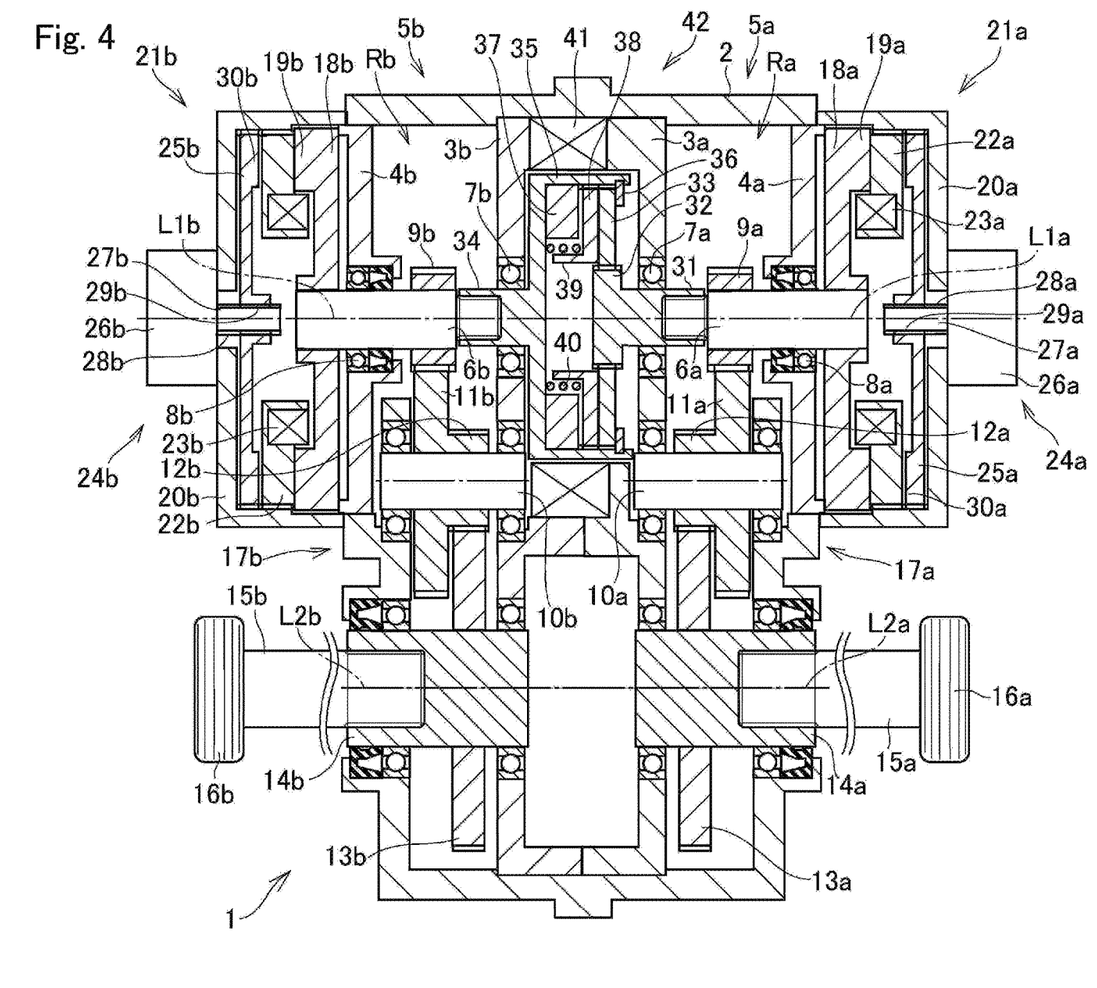
FIG. 4 is a cross-sectional view showing a structure of the brake unit according to a fourth embodiment of the present disclosure.

That is, when the vehicle is parked, the current supply to the coil 41 is stopped and hence the friction clutch 42 is brought into engagement. In this situation, both of the wheels 16a and 16b can be halted by stopping the rotation of any one of the rotary shafts 6a and 6b. In the brake unit 1 according to the second embodiment, therefore, the parking motor 26b and the plate member 25b are arranged only in the wheel 16b side. Optionally, as shown in FIG. 4, the parking motor 26a and the plate member 25a may also be arranged in the wheel 16a side. In the brake unit 1 shown in FIG. 4, the parking motor 26a and the plate member 25a will be used when a failure occurs on the parking motor 26b.

In the embodiments shown in FIGS. 3 and 4, the rotary shafts 6a and 6b are allowed to rotate integrally by the friction clutch 42. In addition, the torques of the wheels 16a and 16b may be equalized by engaging any of rotary elements in the torque transmission route Ra with any of rotary elements in the torque transmission route Rb to equalize rotational speeds of the driveshafts 15a and 15b, or the wheels 16a and 16b.

Figure 5:
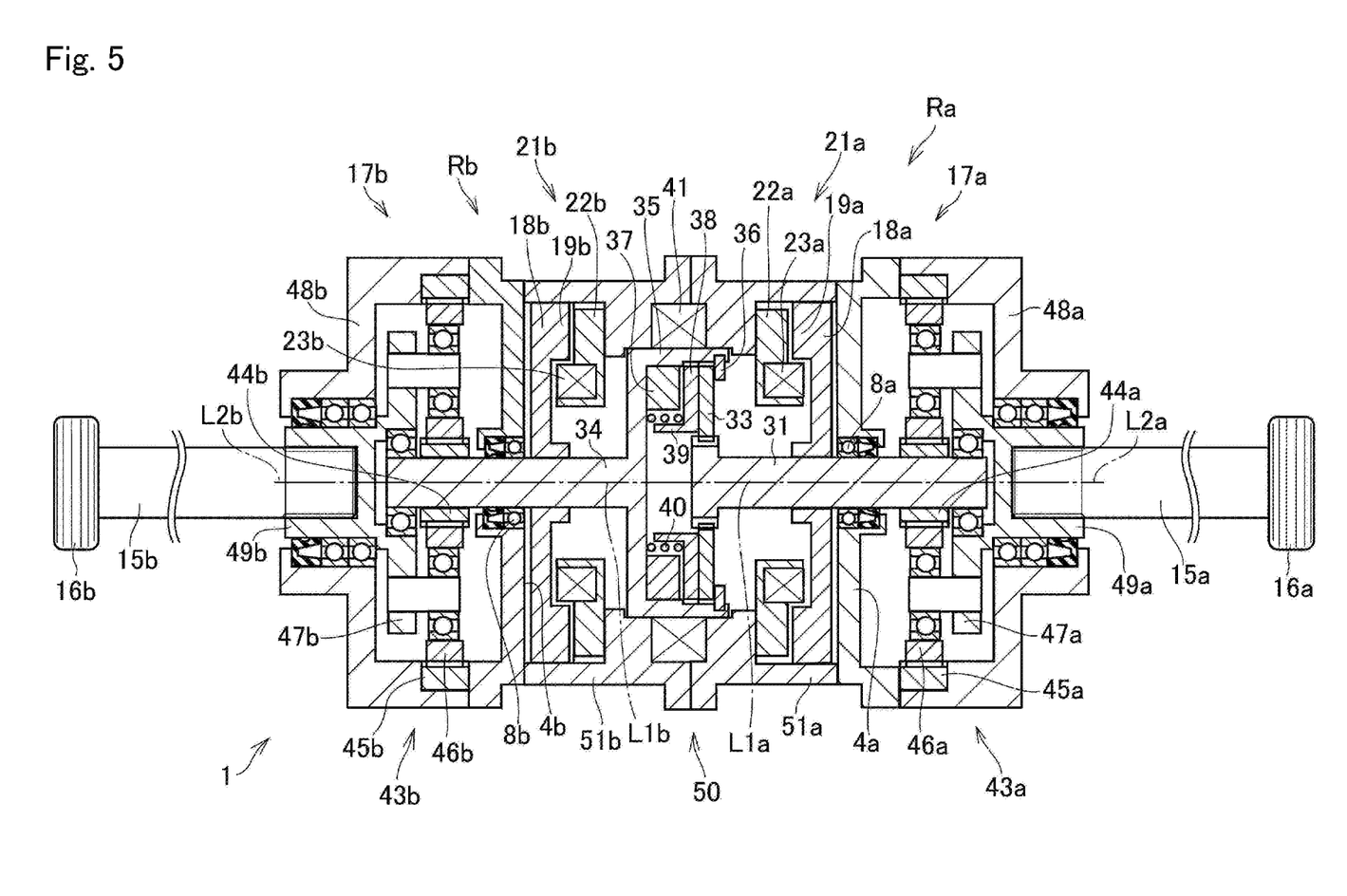
FIG. 5 is a cross-sectional view showing a structure of the brake unit according to a fifth embodiment of the present disclosure.

Turning to FIG. 5, there is shown an embodiment of the brake unit 1 in which the rotary shafts 6a and 6b and the driveshafts 15a and 15b are aligned coaxially. In the following explanation, common reference numerals are allotted to the elements in common with those in the foregoing embodiments, and detailed explanation for those common elements will be omitted. In the brake unit 1 shown in FIG. 5, a single pinion planetary gear unit 43 is connected to the laterally outer end of the rotary shaft 6. Specifically, the planetary gear unit 43 comprises a sun gear 44, a ring gear 45 arranged concentrically with the sun gear 44, a plurality of pinion gears 46 interposed between the sun gear 44 and the ring gear 45, and a carrier 47 supporting the pinion gears 46 in such a manner as to allow the pinion gears 46 to revolve around the sun gear 44.

In the planetary gear unit 43a, the sun gear 44a serves as a first input element, the ring gear 45a serves as a first reaction element, and the carrier 47a serves as a first output element. Likewise, in the planetary gear unit 43b, the sun gear 44b serves as a second input element, the ring gear 45b serves as a second reaction element, and the carrier 47b serves as a second output element.

The planetary gear unit 43 is held in a bottomed-cylindrical cover member 48 in such a manner that the sun gear 44 is rotated integrally with the rotary shaft 6, and that the ring gear 45 is connected to an inner circumferential face of the cover member 48. The carrier 47 is connected to a cylindrical shaft 49, and the cylindrical shaft 49 protrudes laterally outwardly to penetrate through a bottom wall of the cover member 48 while being supported by the cover member 48 in a rotatable manner. In the planetary gear unit 43, the sun gear 44 is rotated at a higher speed than the carrier 47 so that the planetary gear unit 43 serves as the speed reducing device 17. The driveshaft 15 is inserted into the cylindrical shaft 49, and the cover member 48 is joined to laterally outer end of the side wall 4.

The laterally inner end of the side wall 4 is joined to a center housing 50. The center housing 50 is formed by combining inner end portions of cylindrical members 57a and 57b.

The above-explained brake rotor 18 is fitted onto the inner end portion of the rotary shaft 6 of the center housing 50 side. That is, the brake rotor 18 and the pushing member 22 shown in FIG. 1 are held in the center housing 50. In addition, as the embodiments shown in FIGS. 3 and 4, the connection plate 33, the pushing plate 38, the cylindrical portion 39, the coil spring 40, and the coil 41 are interposed between the rotary shafts 6a and 6b to integrate the rotary shafts 6a and 6b. According to the embodiment shown in FIG. 5, the brake torque is maintained during parking by halting any of the rotary members using a not shown pin or the like.

According to the embodiment shown in FIG. 5, a brake torque is applied to the rotary shaft 6 by bringing the pushing member 22 into contact to the brake rotor 18, and the brake torque is further applied to the driveshaft 15 and the wheel 16 through the planetary gear unit 43 while being amplified. According to the embodiment shown in FIG. 5, therefore, the brake rotor 18 and the pushing member 22 may be downsized. In addition, since the rotational center axes L1a and the L1b of the rotary shafts 6a and 6b are aligned coaxially with the rotational center axes L2a and the L2b of the driveshafts 15a and 15b, a height of the brake unit 1 may be shortened.

Although the above exemplary embodiment of the present application has been described, it will be understood by those skilled in the art that the brake device according to the present application should not be limited to the described exemplary embodiment, and various changes and modifications can be made within the spirit and scope of the present disclosure. For example, the brake device 21 and the parking lock device 24 may also be actuated by a hydraulic actuator (s) to maintain the brake torque during parking. In addition, in the brake device 21, the pushing member 22 may also be brought into contact to the brake rotor 18 by a spring, and isolated away from the brake rotor 18 by a load established by an actuator. Further, the parking lock device 24 may also be configured to mechanically stop the rotation of any of the rotary members by engaging a parking gear with a parking lock arm.

What is claimed is:

1. A brake unit, comprising:
   a first driveshaft that is connected to one of right and left wheels; and
   a second driveshaft that is connected to the other one of the right and left wheels while being allowed to rotate relatively to the first driveshaft,
   wherein brake torques are applied to the first driveshaft and the second driveshaft separately,
   the brake unit comprising:
   a first rotary member;
   a first brake device that applies a brake torque to the first rotary member;
   a first speed reducing device that is connected to the first rotary member and the first driveshaft to transmit the brake torque applied to the first rotary member from the first brake device to the first driveshaft while amplifying the brake torque;
   a second rotary member;
   a second brake device that applies a brake torque to the second rotary member; and
   a second speed reducing device that is connected to the second rotary member and the second driveshaft to transmit the brake torque applied to the second rotary member from the second brake device to the second driveshaft while amplifying the brake torque;
   wherein a rotational center axis of a first input member to which the brake torque is delivered from the first rotary member of the first speed reducing device extends in parallel with a rotational center axis of a first output member that transmits the brake torque to the first driveshaft of the first speed reducing device, and
   wherein a rotational center axis of a second input member to which the brake torque is delivered from the second rotary member of the second speed reducing device extends in parallel with a rotational center axis of a second output member that transmits the brake torque to the second driveshaft of the second speed reducing device,
   the brake unit further comprising:
   a brake torque maintaining device that maintains a brake torque established by any one of the first brake device and the second brake device, wherein
   any one of the first brake device and the second brake device includes a brake rotor and a stopper member, any one of the first brake device and the second brake device is adapted to apply a brake torque to the brake rotor by bringing the stopper member into frictional contact to the brake rotor, the brake torque maintaining device is adapted to maintain a frictional force acting between the stopper member and the brake rotor, the first rotary member is rotated integrally with a first brake rotor, the first brake device is adapted to apply a brake torque to the first brake rotor by bringing a first stopper member into frictional contact to the first brake rotor, the second rotary member is rotated integrally with a second brake rotor, the second brake device is adapted to apply a brake torque to the second brake rotor by bringing a second stopper member into frictional contact to the second brake rotor, and the electromagnetic actuator includes a brake motor that is rotated in one direction to bring any one of the first stopper member and the first brake rotor into contact to the other one of the first stopper member and the first brake rotor, and to bring any one of the second stopper member and the second brake rotor into contact to the other one of the second stopper member and the second brake rotor.

2. The brake unit as claimed in claim 1, further comprising:
a clutch that connects a first torque transmitting route of the first speed reducing device including the first rotary member with a second torque transmitting route of the second speed reducing device including the second rotary member.

3. The brake unit as claimed in claim 2, wherein the clutch comprises:
a connection plate that is connected to an end portion of the first rotary member or the second rotary member;
a pushing plate made of magnetic material;
a coil spring that pushes the pushing plate toward the connection plate; and
an electromagnetic coil that is energized to apply an electromagnetic force to the pushing plate against an elastic force of the coil spring.

4. The brake unit as claimed in claim 1, wherein the brake torque maintaining device includes an electromagnetic actuator that is unenergized to maintain the brake torque established by any one of the first brake device and the second brake device.

5. A brake unit, comprising:
a first driveshaft that is connected to one of right and left wheels; and
a second driveshaft that is connected to the other one of the right and left wheels while being allowed to rotate relatively to the first driveshaft,
wherein brake torques are applied to the first driveshaft and the second driveshaft separately,
the brake unit comprising:
a first rotary member;
a first brake device that applies a brake torque to the first rotary member;
a first speed reducing device that is connected to the first rotary member and the first driveshaft to transmit the brake torque applied to the first rotary member from the first brake device to the first drive shaft while amplifying the brake torque;
a second rotary member;

a second brake device that applies a brake torque to the second rotary member; and
a second speed reducing device that is connected to the second rotary member and the second driveshaft to transmit the brake torque applied to the second rotary member from the second brake device to the second driveshaft while amplifying the brake torque,
wherein the first speed reducing device includes a first planetary gear unit comprising a first input element that is connected to the first brake device, a first output element that is connected to the first driveshaft, and a first reaction element that establishes a reaction to output an input torque to the first input element from the first output element,
the second speed reducing device includes a second planetary gear unit comprising a second input element that is connected to the second brake device, a second output element that is connected to the second driveshaft, and a second reaction element that establishes a reaction to output an input torque to the second input element from the second output element,
a rotational center axis of a first input member to which the brake torque is delivered from the first rotary member of the first speed reducing device extends in parallel with a rotational center axis of a first output member that transmits the brake torque to the first driveshaft of the first speed reducing device, and
a rotational center axis of a second input member to which the brake torque is delivered from the second rotary member of the second speed reducing device extends in parallel with a rotational center axis of a second output member that transmits the brake torque to the second driveshaft of the second speed reducing device,
the brake unit further comprising:
a clutch that equalizes rotational speeds of the first driveshaft and the second driveshaft, by connecting a first torque transmitting route of the first speed reducing device including the first rotary member with a second torque transmitting route of the second speed reducing device including the second rotary member,
a brake torque maintaining device that maintains a brake torque established by any one of the first brake device and the second brake device, wherein
any one of the first brake device and the second brake device includes a brake rotor and a stopper member,
any one of the first brake device and the second brake device is adapted to apply a brake torque to the brake rotor by bringing the stopper member into frictional contact to the brake rotor,
the brake torque maintaining device is adapted to maintain a frictional force acting between the stopper member and the brake rotor,
the first rotary member is rotated integrally with a first brake rotor,
the first brake device is adapted to apply a brake torque to the first brake rotor by bringing a first stopper member into frictional contact to the first brake rotor,
the second rotary member is rotated integrally with a second brake rotor,
the second brake device is adapted to apply a brake torque to the second brake rotor by bringing a second stopper member into frictional contact to the second brake rotor, and
the electromagnetic actuator includes a brake motor that is rotated in one direction to bring any one of the first stopper member and the first brake rotor into contact to the other one of the first stopper member and the first brake rotor, and to bring any one of the second stopper member and the second brake rotor into contact to the other one of the second stopper member and the second brake rotor.

6. The brake unit as claimed in claim 1, wherein
the first brake device includes a first actuator that establishes an electromagnetic force to control a brake torque when energized, and
the second brake device includes a second actuator that establishes an electromagnetic force to control a brake torque when energized.

7. The brake unit as claimed in claim 1, wherein
the brake torque is frictional.

8. The brake unit as claimed in claim 1, wherein
the first rotary member and the first driveshaft are continuously mechanically coupled, and
the second rotary member and the second driveshaft are continuously mechanically coupled.

* * * * *